United States Patent
Hanis

(10) Patent No.: US 7,017,149 B2
(45) Date of Patent: Mar. 21, 2006

(54) AUTOMATED SERVLET CONFIGURATION

(75) Inventor: Thomas T. Hanis, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 798 days.

(21) Appl. No.: 10/079,018

(22) Filed: Feb. 19, 2002

(65) Prior Publication Data

US 2003/0158918 A1 Aug. 21, 2003

(51) Int. Cl.
*G06F 9/44* (2006.01)
(52) U.S. Cl. .................................................. 717/121
(58) Field of Classification Search ............. 717/121; 709/220–222
See application file for complete search history.

(56) References Cited

U.S. PATENT DOCUMENTS

2003/0101245 A1* 5/2003 Srinivasan et al. ......... 709/221

OTHER PUBLICATIONS

Bea Systems, Inc. "Packaging WebLogic Server J2EE Applications", 2001.*
JSP/Servlet Development Eniveronment, IBM Visual Age® for Java ™, Ver. 3.5, IBM Corp., © 1998, 2000.
Administer Applications, WebSphere Application Server, <http://www-4.ibm.com/software/webservers/appserv/doc/v35/se/infocenter/was/06.html>, (Jan. 9, 2002).
Preparing To Host Applications, WebSphere Application Server, <http://www-4.ibm.com/software/webservers/appserv/doc/v35/se/infocenter/was/0602.html>, (Jan. 9, 2002).
Installing Applications and Setting Classpaths, WebSphere Application Server, <http://www-4.ibm.com/software/webservers/appserv/doc/v35/se/infocenter/was/0604.html>, (Jan. 9, 2002).
Setting Classpaths, WebSphere Application Server, <http://www-4.ibm.com/software/webservers/appserv/doc/v35/se/infocenter/was/060401.html>, (Jan. 9, 2002).
XMLConfig Command Line Interface For XML Configuration, WebSphere Application Server, <http://www-4.ibm.com/software/webservers/appserv/doc/v35/se/infocenter/was/0606000201.html>, (Jan. 9, 2002).
XMLConfig—Command Syntax, WebSphere Application Server, <http://www-4.ibm.com/software/webservers/appserv/doc/v35/se/infocenter/was/060600020101.html>, (Jan. 9, 2002).
XMLConfig Grammar, WebSphere Application Server, <http://www-4.ibm.com/software/webservers/appserv/doc/v35/se/infocenter/was/060600020102.html>, (Jan. 9, 2002).
XMLConfig—Using The Tool Programmatically, WebSphere Application Server, <http://www-4.ibm.com/software/webservers/appserv/doc/v35/se/infocenter/was/060600020103.html>, (Jan. 9, 2002).
Administering Servlets (*Overview*), WebSphere Application Server, <http://www-4.ibm.com/software/webservers/appserv/doc/v35/se/infocenter/was/060609.html<, (Jan. 9, 2002).

* cited by examiner

*Primary Examiner*—Kakali Chaki
*Assistant Examiner*—Trenton J. Roche
(74) *Attorney, Agent, or Firm*—A. Bruce Clay, Esq.; Steven M. Greenberg, Esq.; Christopher & Weisberg, P.A.

(57) ABSTRACT

A system and method for automated servlet configuration. In a servlet development environment, an automated servlet configuration file generation method can include querying a subject servlet for associated servlet configuration data through the servlet development environment. Subsequently, the servlet configuration data can be incorporated in a servlet configuration file. In consequence, the servlet configuration file can be processed in an application server to explicitly configure the subject servlet.

10 Claims, 2 Drawing Sheets

AUTOMATED SERVLET CONFIGURATION

BACKGROUND OF THE INVENTION

1. Statement of the Technical Field

The present invention relates to the field of servlet deployment and more particularly to servlet configuration in an application server.

2. Description of the Related Art

Servlets are programs that extend content servers by providing a component-based method for building content-based applications. In particular, an application server can incorporate servlets in combination with markup and other resources to form a Web application. More recently, Web applications have been packaged for deployment using archive tools and deployed across multiple differing containers. For instance, version 2.2 of the Java™ Servlet Application Programming Interface (API) provides for a Web archive (WAR) file which includes the bundling of servlets, hypertext markup language pages, Java classes and other resources.

From an application server perspective, servlets can be deployed alone or within an archive. In both circumstances, however, the application server must have an awareness of particular run-time characteristics of the servlet, for example context initialization parameters, session configuration information, markup tag definitions and mappings to the servlet and its respective encapsulated members, MIME type mappings, a welcome file list, error pages and security data. Additionally, the servlets must be made available to the application server through a specified file system search path. For instance, where a servlet implements the Java Servlet API, a corresponding application server will be able to access the servlet only through a file system search path specified by the classpath environment variable.

Application server administrators typically define servlets in two ways. In the first case, the application server administrator can define the servlet to the application server as an explicit server resource belonging to a particular application. For example, the application server administrator can explicitly configure the application server with a servlet resource for each servlet class file. Notably, in conventional application servers, the explicit configuration of a servlet is performed individually for each servlet defined in a deployed application.

In any case, during the development phase of a Web application to be deployed in an application server, the number and characteristic of individual servlets for which the Web application can be configured and the respective names of those servlets can change continuously. In consequence, in addition to the explicit configuration of a servlet, conventional application servers can be configured implicitly. In particular, an implicit configuration of the application server can permit the application server to invoke any servlet residing in a specified file system search path. The implicit configuration of servlets can be accomplished by adding an "invoker servlet" to the Web application, as is well-known in the art. Importantly, it is efficient to use an implicit configuration during application development because, as new servlets are added to the application, or as existing servlets change, no modifications are necessary to the application server configuration for development testing.

Nevertheless, when deploying a Web application, implicit servlet configuration no longer remains an efficient strategy. Specifically, there are disadvantages to enabling serving servlets implicitly by reference to file system search path, rather than explicitly by reference to the servlet itself. First, an explicitly configured servlet can be monitored individually, but an implicitly configured servlet cannot be monitored individually. Thus, if an application administrator requires servlet performance statistics such as requests and execution time, then those servlets must be explicitly configured.

Second, the use of an implicit invoker servlet presents security issues. In particular, when a Web application permits end users to invoke servlets that are implicitly defined, then users can access any servlets defined in the file system search path of the Web application. In consequence, it is not possible to limit access to servlets that are on the classpath. Once the application server has been configured to permit the implicit invocation of servlets, any servlet function that resides in specified file system search path can be invoked by the application users. Notably, many conventional application servers implement security based upon defining and securing individual servlet resources.

Ordinarily, a servlet can be explicitly configured in an application server through the manual navigation of a servlet configuration module. For instance, typically the application server administrator can enter an administration console of the application server through which the administrator can specify a servlet, an application server, a servlet engine, and Web application. Subsequently, the administrator can select an explicit servlet configuration menu option in the console. As one skilled in the art will recall, this manual process must be repeated for each servlet defined in the Web application to be deployed.

Recently, application servers have included servlet deployment tools which automate the heretofore manual configuration process. In particular, the servlet configuration information can be included in a document which can be provided to the application server in lieu of an administrator manually configuring the application server for each servlet. In the WebSphere™ application server, manufactured by International Business Machines Corporation of Armonk, N.Y., for example, an "XMLConfig" tool can be used to produce extensible markup language (XML) formatted configuration files. Nevertheless, the configuration still must be manually specified in the configuration file. Hence, the production of a configuration file still requires much tedium and effort.

SUMMARY OF THE INVENTION

The present invention is a method and system for automated servlet configuration. The use of the present invention can overcome the inherent deficiencies of the prior art by providing a servlet deployment tool which can automate the heretofore manual configuration process associated with conventional servlet configuration. In a servlet development environment, an automated servlet configuration file generation method can include querying a subject servlet for associated servlet configuration data through the servlet development environment. Subsequently, the servlet configuration data can be incorporated in a servlet configuration file. In consequence, the servlet configuration file can be processed in an application server to explicitly configure the subject servlet.

Notably, the automated servlet configuration file generation method also can include selecting a servlet super class; identifying each servlet which extends from the selected super class; and, performing the querying and incorporating steps for each identified servlet. Moreover, abstract classes implemented by the servlet can be identified and the identified abstract class can be omitted during the performing step. Similarly, one or more packages can be identified wherein the package can include at least one of the identified servlets. Again, the identified package can be omitted during the performing step.

Importantly, the method can incorporate a selection of configuration processing wrappers. Specifically, at least one configuration processing wrapper can be identified in the method, the configuration processing wrapper providing additional instructions for incorporating the servlet configuration data in the servlet configuration file. Once identified, the incorporating step can be performed according to the additional instructions in the wrapper.

The method of the invention can be extended beyond bare servlet configuration to the configuration of a Web application for deployment in an application server. Specifically, in a Web application development environment, an automated Web application archive file generation method can include querying a subject Web application for associated Web application configuration data through the Web application development environment. Subsequently, the Web application configuration data can be incorporated in a Web application configuration descriptor. Finally, the subject Web application and the Web application descriptor can be archived in a Web application archive file. In consequence, the Web application configuration descriptor can be processed in an application server to explicitly configure the Web application.

A servlet development environment which has been configured in accordance with the inventive arrangements can include a servlet development environment, an automated servlet configuration tool, a servlet configuration file processor, and a graphical user interface (GUI). The servlet development environment can be used to edit, compile and configure servlets for deployment in an application server. By comparison, the automated servlet configuration tool can include a servlet query engine for querying servlets for associated servlet configuration data. Likewise, the servlet configuration file processor can format the associated servlet configuration data into a servlet configuration file which can be processed in the application server. Finally, through the GUI users can select processing parameters utilized by the automated servlet configuration tool when performing the querying and formatting.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a system and method for automating the configuration of a servlet or Web application in an application server. In accordance with a servlet configuration aspect of the present invention, a servlet development tool can query an application for servlet definition data which is to be specified in a servlet configuration file. Subsequently, the development tool can produce a servlet configuration file which incorporates the discovered servlet definition data. The servlet configuration file, in turn, can be provided to the application server, with which the application server can explicitly configure the associated servlets for use in a specified Web application. In this way, the tedium and effort ordinarily involved in the manual configuration of a servlet can be avoided.

Figure 1:
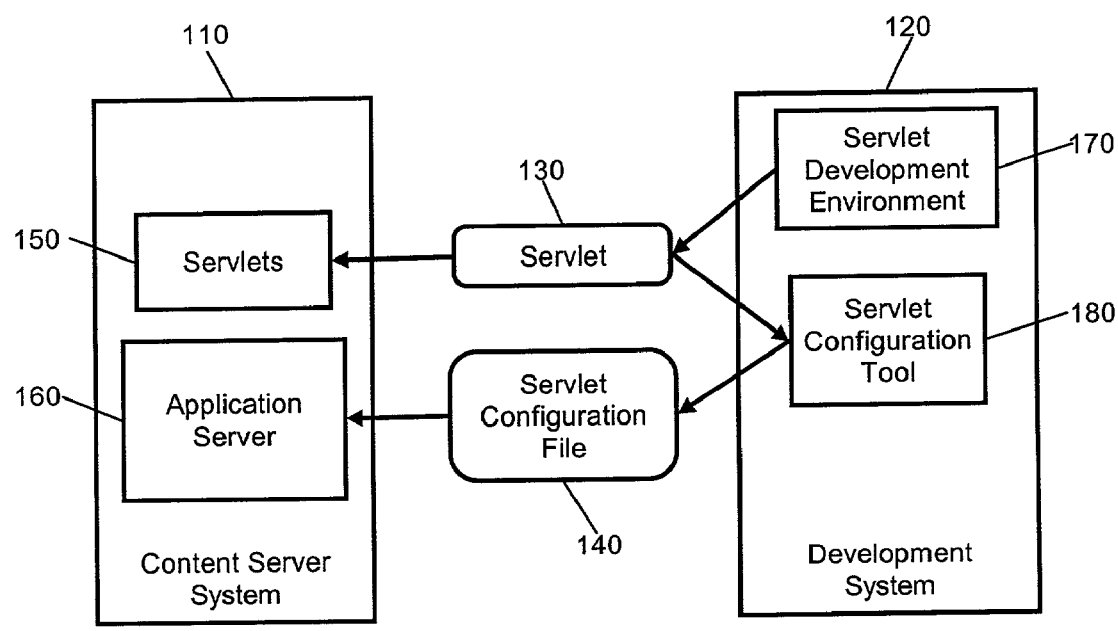
FIG. 1 is a block diagram of a development system configured to automate the servlet configuration process; and, FIG. 2 is a pictorial illustration of a process for producing a servlet configuration file using the development tool of FIG. 1.

FIG. 1 is a block diagram of a development system configured to automate the servlet configuration process. The development system 120 shown in FIG. 1 can include both a servlet development environment 170 and a servlet configuration tool 180. The servlet development environment 170 can be used to produce servlets 130 in a fashion similar to creation of any computer program through an integrated development environment (IDE) as is well-known in the art. In one aspect of the present invention, the servlet development environment 170 can be included as part of the software development tool, Visual Age® for Java, manufactured by International Business Machines Corporation of Armonk, N.Y. Still, the invention is not limited in regard to any particular software development environment and other software development environments through which servlets can be created can suffice.

The servlet configuration tool 180 can be used to query a servlet 130 created in the servlet development environment 170 to discover servlet definition data associated with the servlet which ordinarily would be manually identified by an application server administrator which producing a servlet configuration file. In accordance with the present invention, however, the servlet configuration tool 180 can utilize the servlet definition data to automatically produce a servlet configuration file 140. For example, in one aspect of the invention, a graphical user interface (GUI) can be provided to the servlet developer through which the developer can specify a particular servlet for which a servlet configuration file can be created. Once the particular servlet has been specified, the pertinent servlet configuration data can be identified and written to a configuration file, for instance using the XML format.

Subsequently, the servlet 130 can be deployed in a content server system 110 for use in a Web application. In particular, the content server system 110 can include an application server 160 which can host and manage a collection of markup language documents in conjunction with servlets 150, the combination of which can form the core of the Web application. Using the servlet configuration file 140, the application server 160 can be explicitly configured to utilize the servlet 130 once the servlet 130 has been stored within a specified file system search path. For instance, in the WebSphere application server, the servlet 130 can be explicitly configured merely by storing the servlet 130 within a specified classpath and by importing the corresponding servlet configuration file 140.

Notably, development system 120 of FIG. 1 can be further configured not only to process servlets, but also to process entire Web applications incorporating a collection of servlets, markup, classes and the like. Specifically, the servlet configuration tool 180 can be extended to query the Web application to discover the specific application configuration data such as servlet context initialization parameters, session configuration data, servlet/server page definitions and server page tag mappings, MIME type mappings, a welcome file list, error pages and security. Once discovered, the specific application configuration data can be included in a Web application configuration descriptor and packaged in a WAR file along with the Web application.

Figure 2:
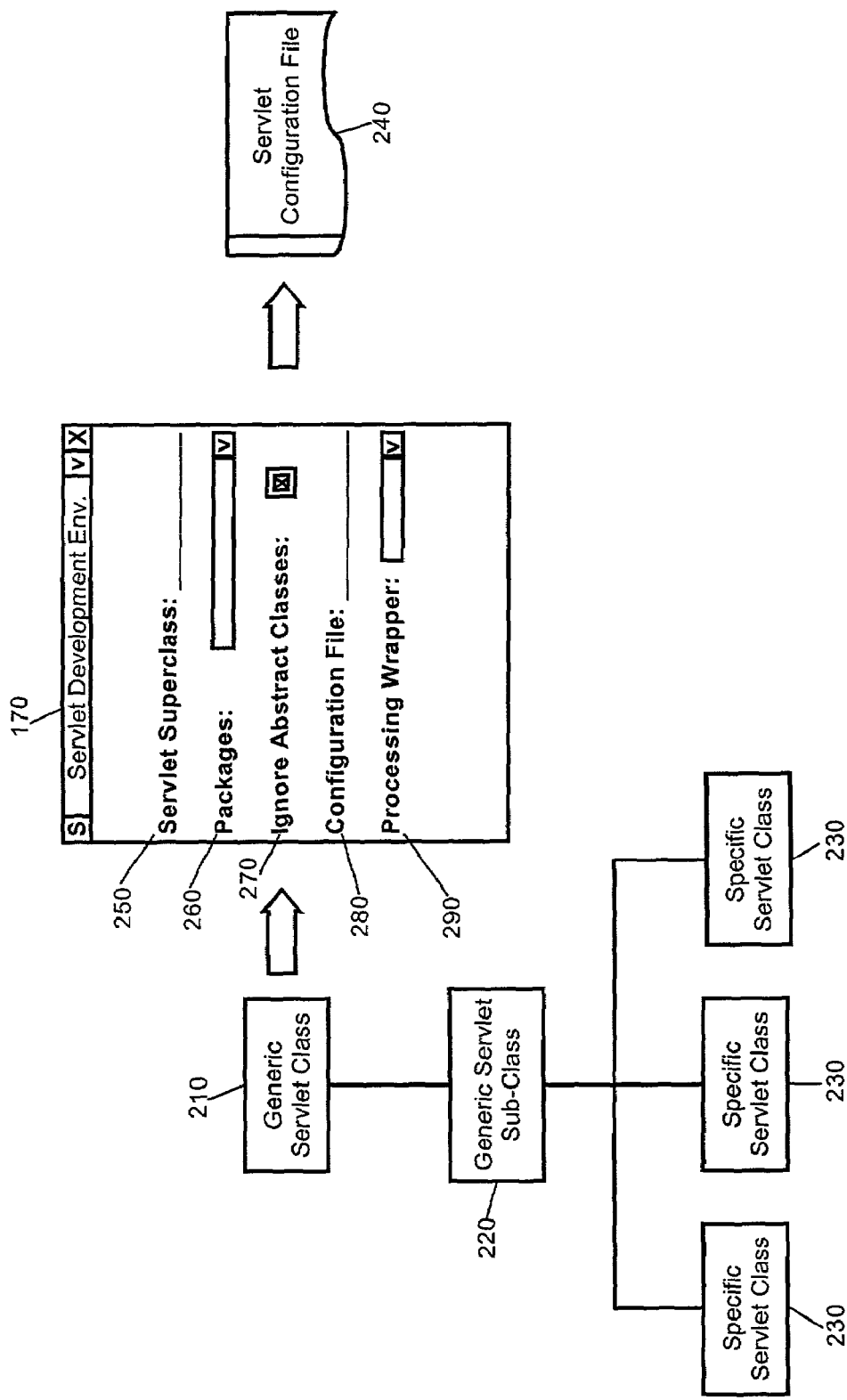

FIG. 2 is a pictorial illustration of a GUI-driven process for producing a servlet configuration file in the servlet development environment 170 of FIG. 1. Specifically, using the GUI of the servlet development environment 170, in combination with the class querying services of the IDE of the servlet development environment 170, the required servlet configuration data can be identified and included in a servlet configuration file 240. Notably, the pertinent servlet configuration data can include those specific servlet properties ordinarily specified by the application server administrator, for instance an administrative name, a class name, the name of the Web application to which the servlet belongs, and the location at which the servlet can be accessed.

Importantly, the flexibility provided by the GUI can permit selective control over the servlet configuration process. For example, in one aspect of the invention illustrated in FIG. 2, the user can specify the target name and path for the servlet configuration file 240 using a suitable GUI element such as a file-dialog 280. Additionally, as shown in FIG. 2, a hierarchy of servlet classes can be selected for automatic servlet configuration. For instance, the hierarchy can be specified according to a common super-class selected using the file-browsing interface 250 of the GUI.

Notably, in accordance with the Java Servlet API specification, all application specific servlets 230 are sub-classes of the system defined generic servlet class 220, "javax.servlet.HTTPServlet", or more broadly, "javax.servlet.GenericServlet" 210. In consequence, the servlet development environment 170 can query the generic servlet class 210 (or generic servlet class 220) to provide a menu of sub-classes for a particular user for display in the file-browsing interface 250. Still, the invention is not limited to the particular GUI element selected to present the menu of sub-classes and any suitable GUI element can suffice in this regard.

The GUI further can include a drop-down list of packages 260 to be omitted from the configuration process. In particular the drop-down list of packages 260 can accommodate a well-defined servlet hierarchy that is consistent with the functional requirements of a Web application. Yet, on occasion it is preferable to omit the configuration of servlets in a hierarchy which reside in particular packages. For instance, in many cases a hierarchy of servlets can include specific servlets which are separately managed as a single collection of code and which are functionally unrelated to the remaining servlets in the hierarchy. Having different application server deployment requirements, the specific servlets in the packages can be omitted from servlet configuration processing by selecting those packages through the drop-down list of packages 260 in the GUI.

The GUI also can include a check-box 270 for omitting abstract classes from the configuration process. The check-box 270, when selected, can cause the servlet development environment 170 to exclude abstract classes in the hierarchy which should not be considered when generating the configuration file 240. In particular, as abstract classes cannot be instantiated, abstract classes consequently should not be defined to the application server.

Finally, the GUI can include a configuration processing wrapper drop-down box 290. The configuration processing wrapper drop-down box 290 can permit the selection of a particular configuration processing wrapper with which the servlet configuration file 240 can be generated. Specifically, individual configuration processing wrappers can generate a servlet configuration file 240 based upon a specified servlet in differing ways, depending upon the specific requirements of the application server. For example, a set of individual configuration processing wrappers can generate a servlet alias name of a specified servlet as one of a fully qualified class name, as a short class name, or as a short class name having the string "Servlet" removed therefrom. Depending upon the naming conventions set forth in the application server, a servlet developer can select a suitable configuration processing wrapper using the configuration processing wrapper drop-down box 280 of the GUI.

Thus, the present invention can capitalize upon the inherent capability of the servlet development environment 170 to identify servlet configuration data necessary to explicitly configure the servlet in an application server. Hence, the process of creating the servlet configuration file 240 can be automated resulting in an elimination of the tedium and complexity formerly associated with the manual creation of the servlet configuration file. Moreover, the introduction of human error in the servlet configuration file creation process pan be minimized while maintaining flexibility in performing the configuration process.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. In a servlet development environment, an automated servlet configuration file generation method, comprising the steps of:

querying a subject servlet for associated servlet configuration data through the servlet development environment;

incorporating said servlet configuration data in a servlet configuration file, whereby said servlet configuration file can be processed in an application server to explicitly configure said subject servlet;

identifying at least one configuration processing wrapper, said configuration processing wrapper providing additional instructions for incorporating said servlet configuration data in said servlet configuration file; and, performing said incorporating step according to said additional instructions in said wrapper.

2. The method of claim 1, further comprising the steps of:
selecting a servlet super class;
identifying each servlet which extends from said selected super class; and,
performing said querying and incorporating steps for each said identified servlet.

3. The method of claim 2, further comprising the steps of:
identifying at least one abstract class implemented by said servlet; and,
omitting said at least one abstract class during said performing step.

4. In a servlet development environment, an automated servlet configuration file generation method, comprising the steps of:
querying a subject servlet for associated servlet configuration data through the servlet development environment;
incorporating said servlet configuration data in a servlet configuration file, whereby said servlet configuration file can be processed in an application server to explicitly configure said subject servlet;
selecting a servlet super class;
identifying each servlet which extends from said selected super class;
performing said querying and incorporating steps for each said identified servlet;
identifying at least one package, said package comprising at least one of said identified servlets; and,
omitting said at least one identified servlet in said package during said performing step.

5. In a Web application development environment, an automated Web application archive file generation method, comprising the steps of:
querying a subject Web application for associated Web application configuration data through the Web application development environment;
incorporating said Web application configuration data in a Web application configuration descriptor;
archiving said subject Web application and said Web application descriptor in a Web application archive file, whereby said Web application configuration descriptor can be processed in an application server to explicitly configure said Web application;
identifying at least one configuration processing wrapper, said configuration processing wrapper providing additional instructions for incorporating said Web application configuration data in said Web application configuration descriptor; and,
performing said incorporating step according to said additional instructions in said wrapper.

6. A machine readable storage having stored thereon a computer program for automating the generation of a servlet configuration file, said computer program comprising a routing set of instructions for causing the machine to perform the steps of:
querying a subject servlet for associated servlet configuration data through an interface to a servlet development environment; and,
incorporating said servlet configuration data in a servlet configuration file, whereby said servlet configuration file can be processed in an application server to explicitly configure said subject servlet;
identifying at least one configuration processing wrapper, said configuration processing wrapper providing additional instructions for incorporating said servlet configuration data in said servlet configuration file; and,
performing said incorporating step according to said additional instructions in said wrapper.

7. The machine readable storage of claim 6, further comprising the steps of:
selecting a servlet super class;
identifying each servlet which extends from said selected super class; and,
performing said querying and incorporating steps for each said identified servlet.

8. The machine readable storage of claim 7, further comprising the steps of:
identifying at least one abstract class implemented by said servlet; and,
omitting said at least one abstract class during said performing step.

9. A machine readable storage having stored thereon a computer program for automating the generation of a servlet configuration file, said computer program comprising a routing set of instructions for causing the machine to perform the steps of:
querying a subject servlet for associated servlet configuration data through an interface to a servlet development environment;
incorporating said servlet configuration data in a servlet configuration file, whereby said servlet configuration file can be processed in an application server to explicitly configure said subject servlet;
selecting a servlet super class;
identifying each servlet which extends from said selected super class;
performing said querying and incorporating steps for each said identified servlet;
identifying at least one package, said package comprising at least one of said identified servlets; and,
omitting said at least one identified servlet in said package during said performing step.

10. A machine readable storage having stored thereon a computer program for automating the generation of a Web application archive file, said computer program comprising a routing set of instructions for causing the machine to perform the steps of:
querying a subject Web application for associated Web application configuration data through an interface to a Web application development environment;
incorporating said Web application configuration data in a Web application configuration descriptor; and,
archiving said subject Web application and said Web application descriptor in a Web application archive file, whereby said Web application configuration descriptor can be processed in an application server to explicitly configure said Web application;
identifying at least one configuration processing wrapper, said configuration processing wrapper providing additional instructions for incorporating said Web application configuration data in said Web application configuration descriptor; and,
performing said incorporating step according to said additional instructions in said wrapper.

* * * * *